(12) United States Patent
Jo et al.

(10) Patent No.: US 11,301,871 B2
(45) Date of Patent: Apr. 12, 2022

(54) CRUM APPARATUS TO EXTRACT POWER FROM CLOCK SIGNAL HAVING FIRST AND SECOND PERIODS

(71) Applicant: Hewlett-Packard Development Company, L.P., Spring, TX (US)

(72) Inventors: Daeho Jo, Seongnam-si (KR); Younjae Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 71 days.

(21) Appl. No.: 17/040,737

(22) PCT Filed: Jul. 31, 2018

(86) PCT No.: PCT/KR2018/008684
§ 371 (c)(1),
(2) Date: Sep. 23, 2020

(87) PCT Pub. No.: WO2019/203396
PCT Pub. Date: Oct. 24, 2019

(65) Prior Publication Data
US 2021/0012354 A1    Jan. 14, 2021

(30) Foreign Application Priority Data
Apr. 18, 2018    (KR) .......................... 10-2018-0045139

(51) Int. Cl.
*G03G 15/00*    (2006.01)
*G06Q 30/00*    (2012.01)
(Continued)

(52) U.S. Cl.
CPC ......... *G06Q 30/016* (2013.01); *G03G 15/553* (2013.01); *G06F 1/10* (2013.01); *G06F 1/08* (2013.01)

(58) Field of Classification Search
CPC .... G03G 15/00; G03G 15/0863; G03G 15/14; G03G 15/2039; G03G 15/553; G03G 21/16; G03G 21/1867; G03G 21/1875
(Continued)

(56) References Cited

U.S. PATENT DOCUMENTS 8,289,788 B2    10/2012  Asauchi
8,395,790 B2    3/2013   Takeda
(Continued)

FOREIGN PATENT DOCUMENTS

CN    101527767 A    9/2009
CN    102402153 A    4/2012
(Continued)

*Primary Examiner* — Hoan H Tran
(74) *Attorney, Agent, or Firm* — Jefferson IP Law, LLP

(57) ABSTRACT

A CRUM apparatus includes a power extraction circuit that extracts power from a high value of a clock signal received from an image forming apparatus, and a control circuit activated by the power extracted by the power extraction circuit. The clock signal has high and low values alternately repeated in a first period in a data section and the high and low values alternately repeated in a second period different from the first period in a pause section. When the second period is changed to a fourth period in an idle section in which data transmission is prepared, the control circuit determines transmission and reception of a data signal to and from the image forming apparatus is to be performed at a third period different from the first period for a second data section after the idle section.

15 Claims, 11 Drawing Sheets

(51) Int. Cl.
  *G06F 1/10*   (2006.01)
  *G06F 1/08*   (2006.01)
(58) Field of Classification Search
  USPC ............................................ 399/24, 25, 111
  See application file for complete search history.

(56) References Cited

U.S. PATENT DOCUMENTS

| | | |
|---|---|---|
| 9,665,059 B2 | 5/2017 | Kim |
| 2009/0222664 A1 | 9/2009 | Cho et al. |
| 2016/0098060 A1 | 4/2016 | Seo et al. |

FOREIGN PATENT DOCUMENTS

| | | | |
|---|---|---|---|
| CN | 104462931 A | 3/2015 | |
| CN | 104915317 A | 9/2015 | |
| CN | 105009136 A | 10/2015 | |
| CN | 104275939 B | 3/2016 | |
| CN | 105487993 A | 4/2016 | |
| CN | 107065471 A | 8/2017 | |
| CN | 107085682 A | 8/2017 | |
| CN | 107423614 A | 12/2017 | |
| EP | 2 869 133 A1 | 5/2015 | |
| EP | 3007007 A1 * | 4/2016 | ........... G06F 3/0629 |
| JP | 7-81186 A | 3/1995 | |
| JP | 2008-44307 A | 2/2008 | |
| JP | 2013-218199 A | 10/2013 | |
| KR | 1992-0000500 A | 1/1992 | |
| KR | 1998-060407 U | 11/1998 | |
| KR | 10-2009-0028497 A | 3/2009 | |
| WO | WO-2015/065081 A1 | 5/2015 | |

\* cited by examiner

[Fig. 1]
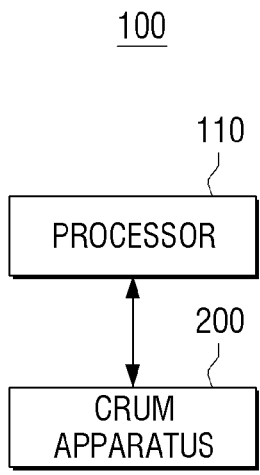
[Fig. 2]
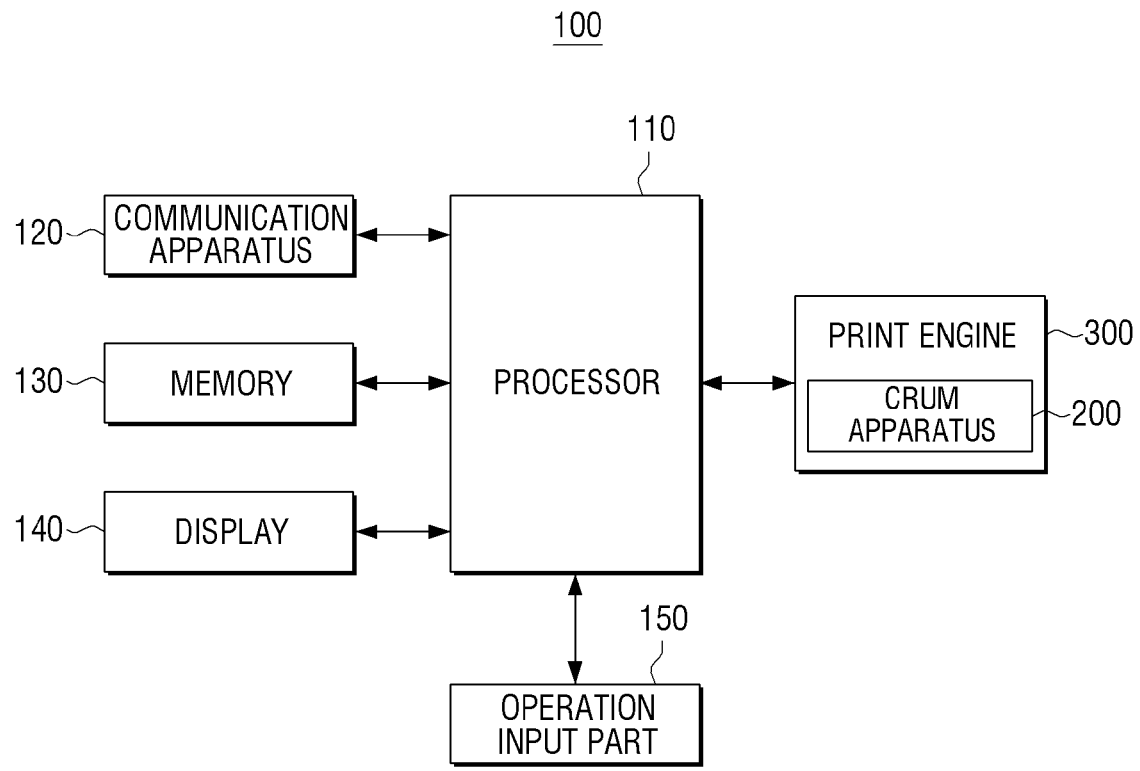

[Fig. 3]
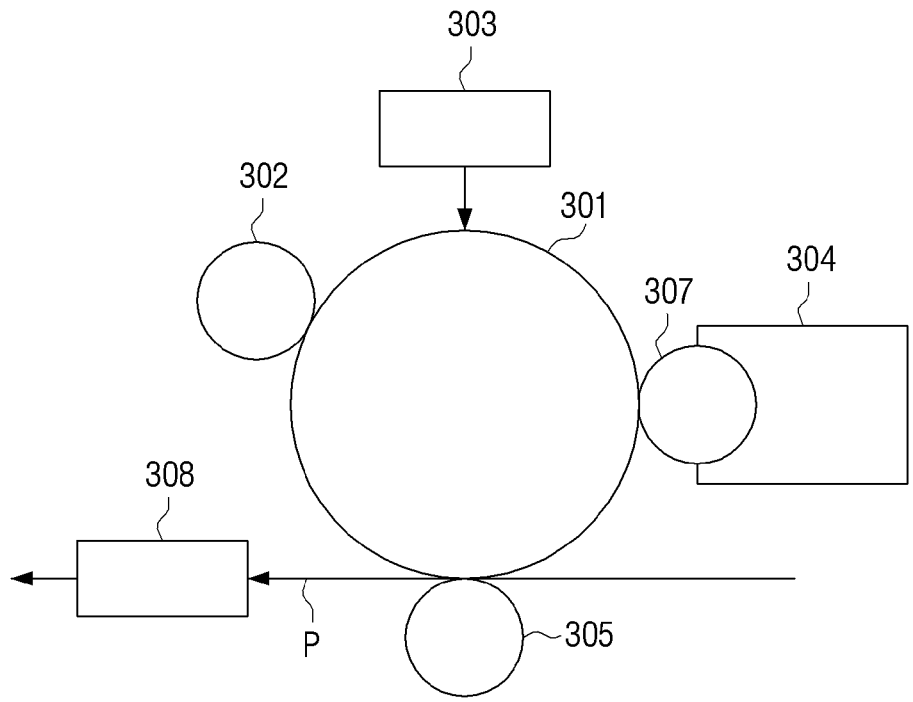
[Fig. 4]
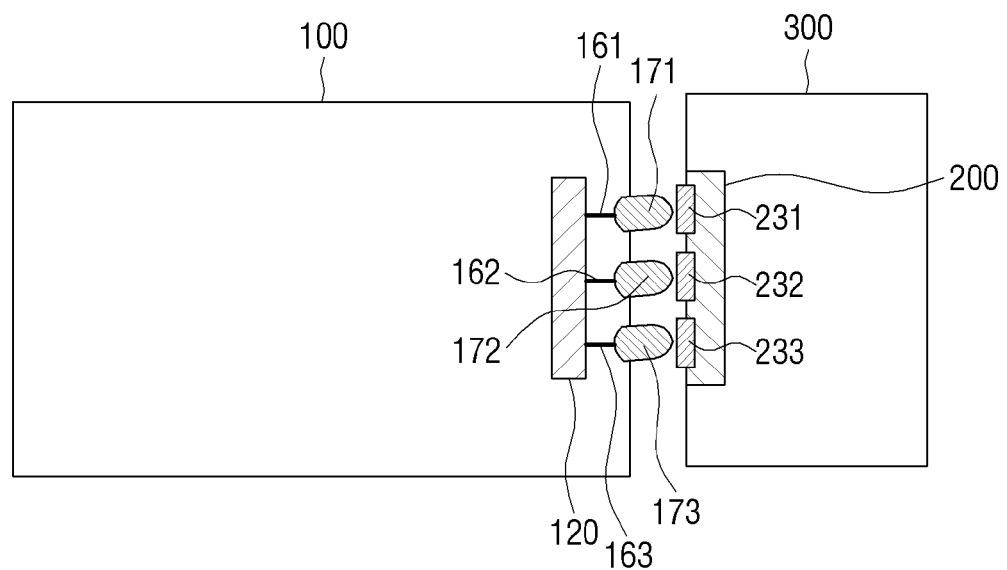

[Fig. 5]
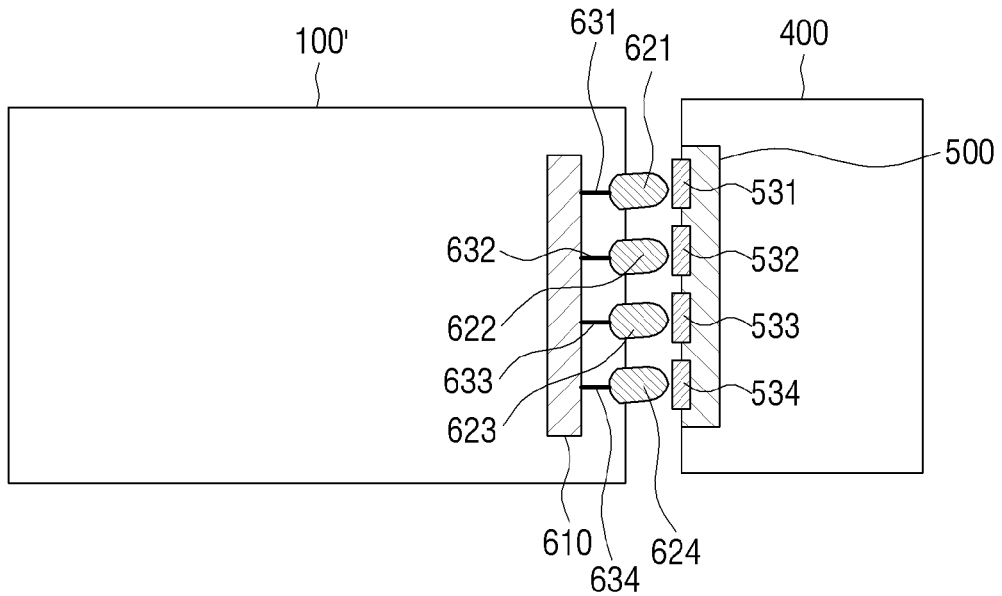
[Fig. 6]
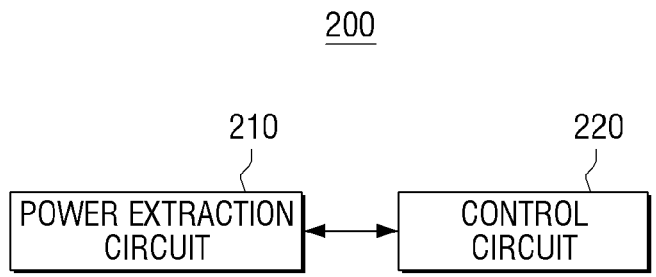
[Fig. 7]
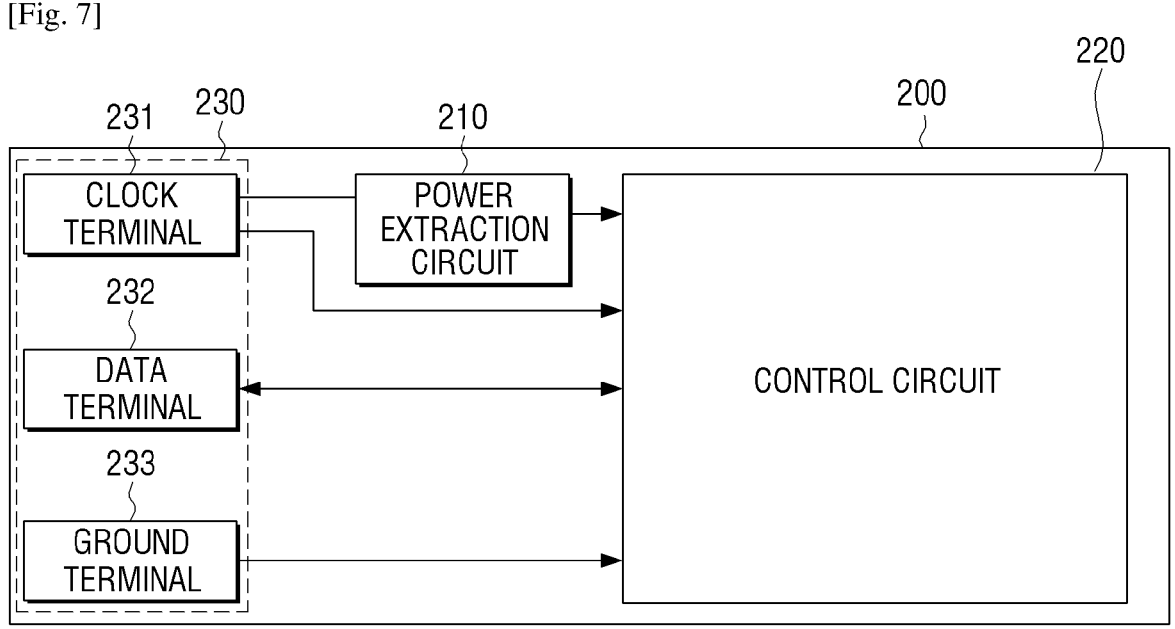

[Fig. 8]
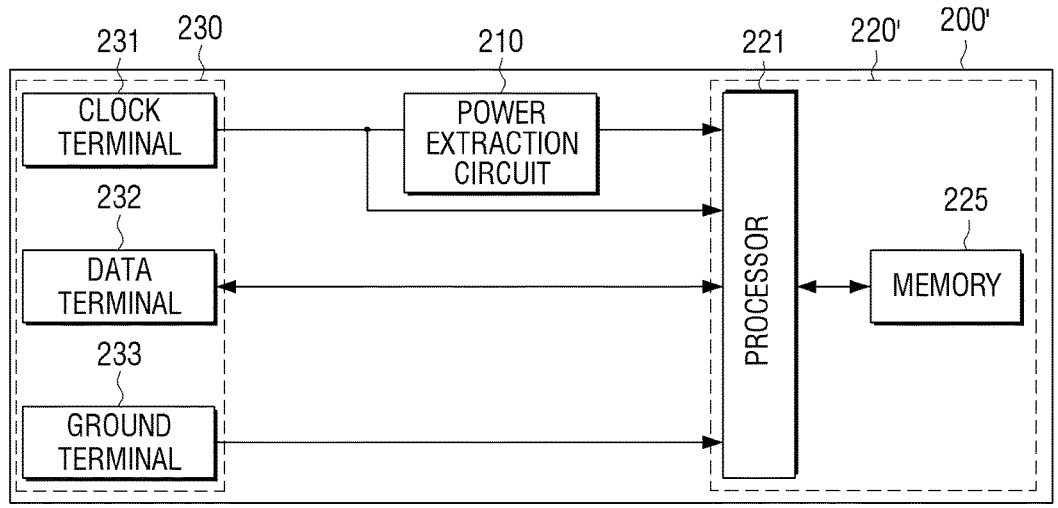
[Fig. 9]
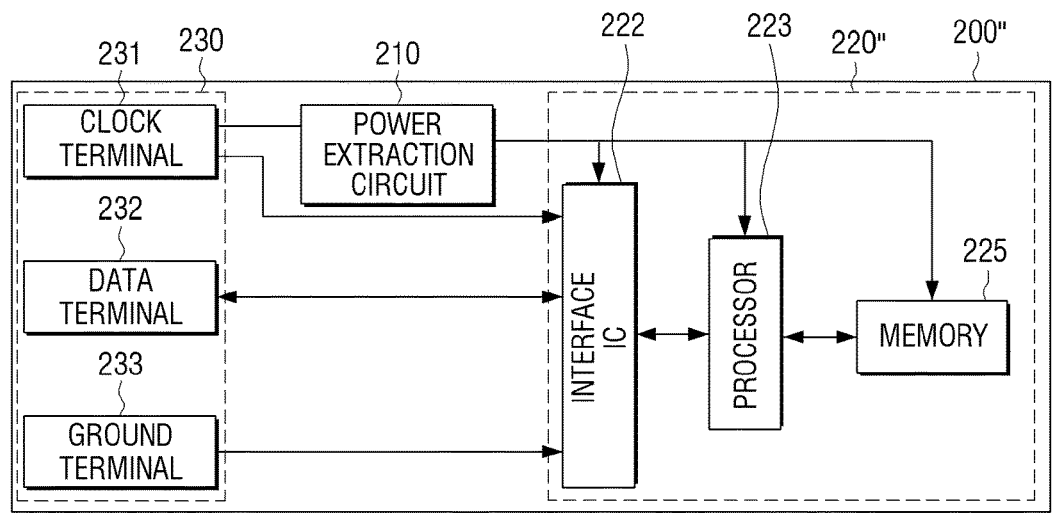
[Fig. 10]
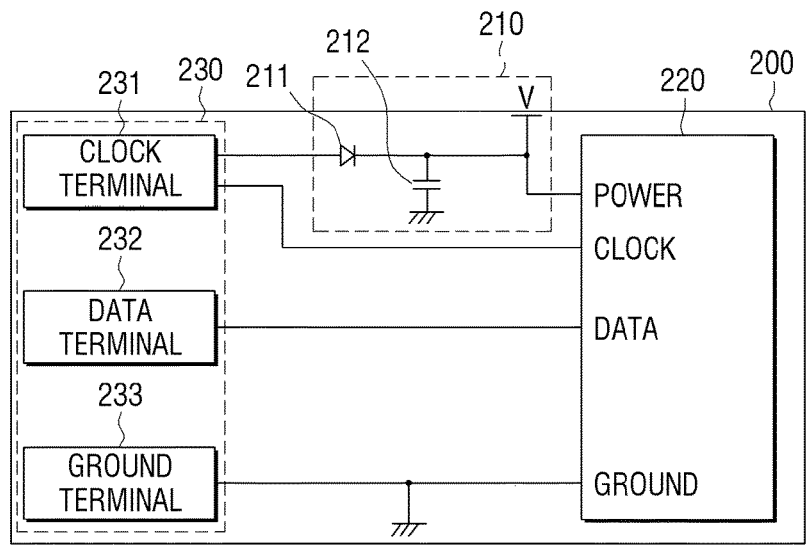

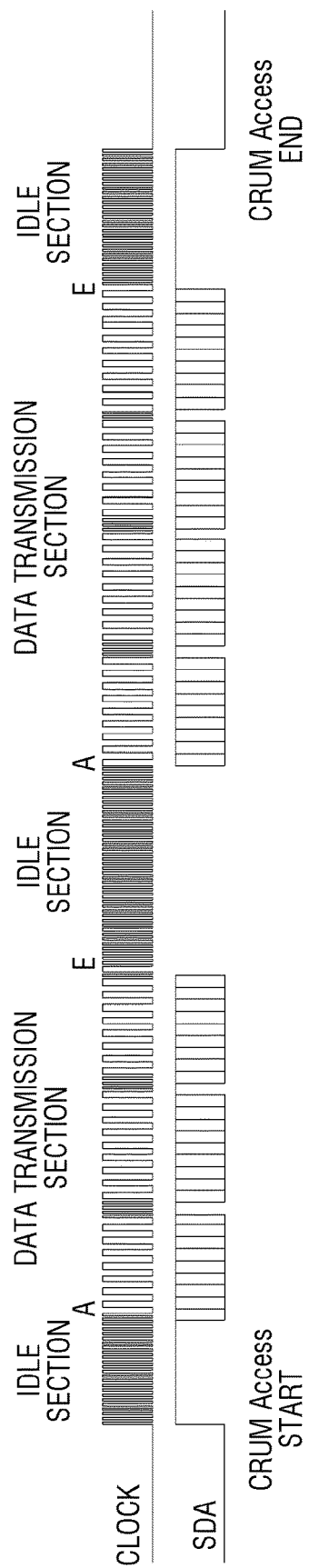
[Fig. 11]

[Fig. 12]
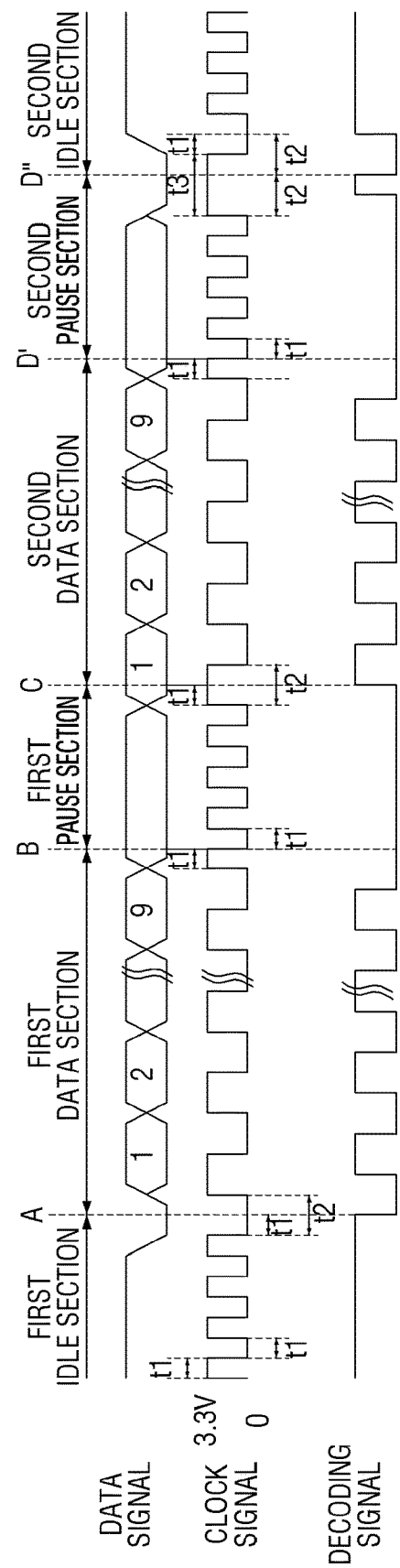

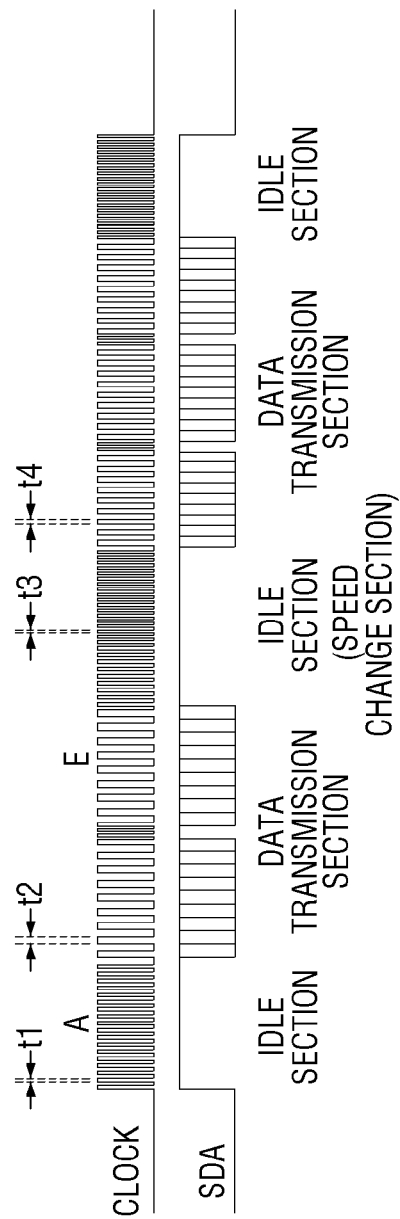

[Fig. 14]
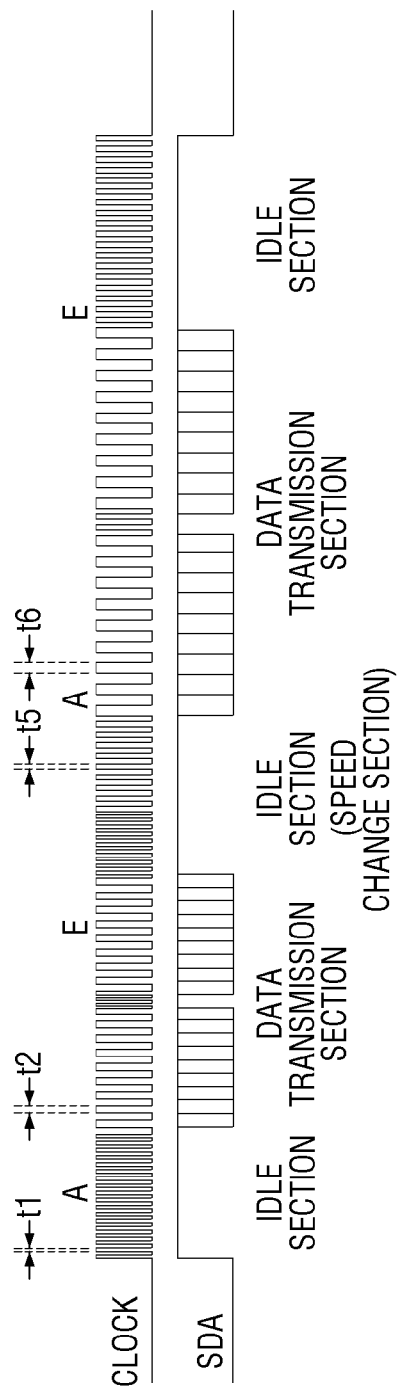

[Fig. 15]
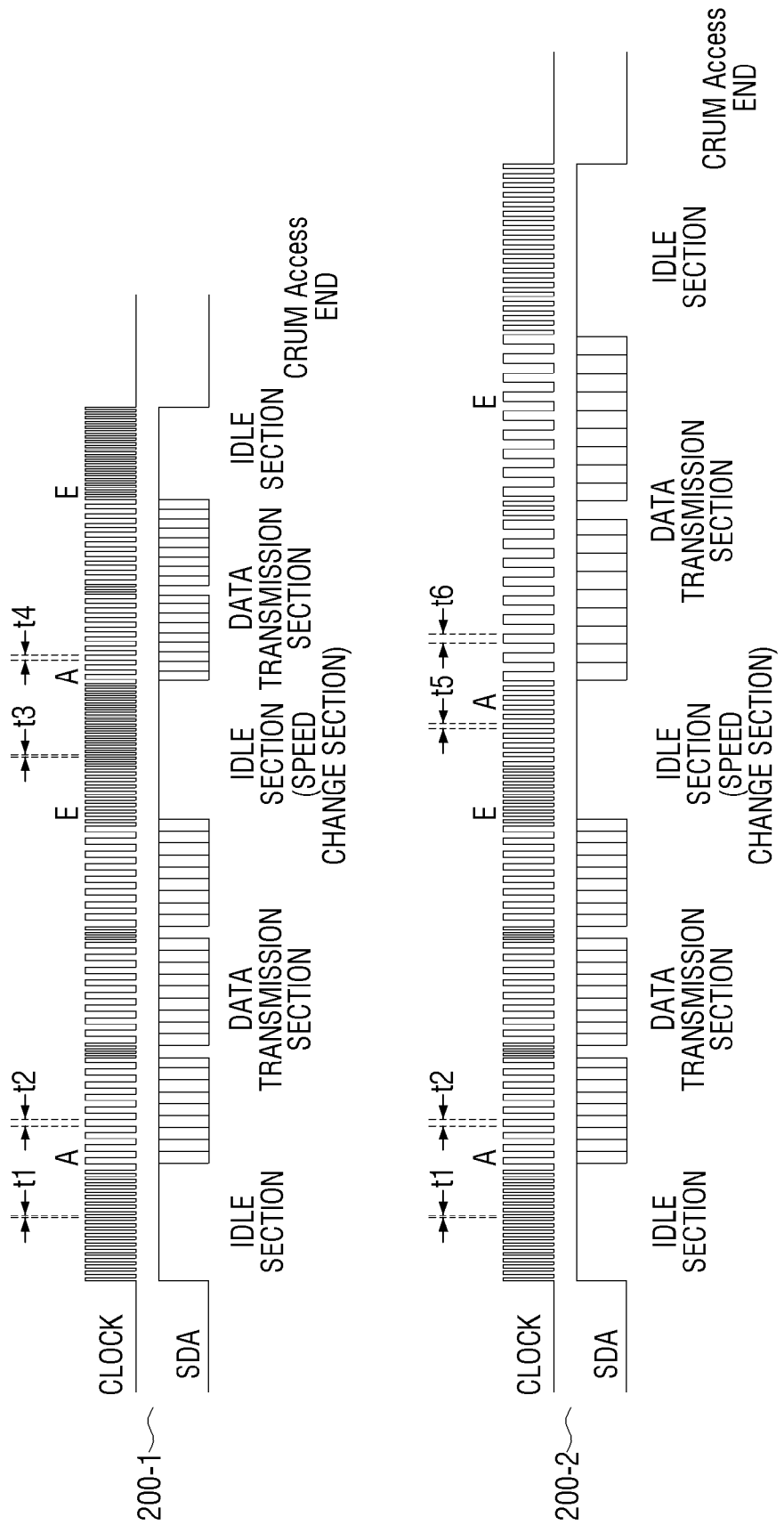

[Fig. 16]
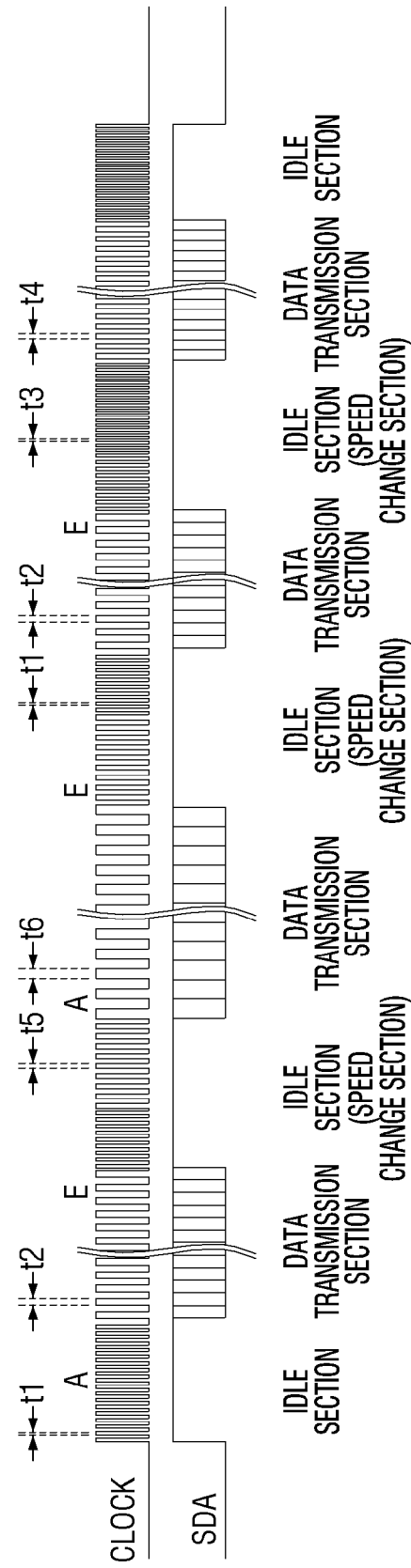

[Fig. 17]
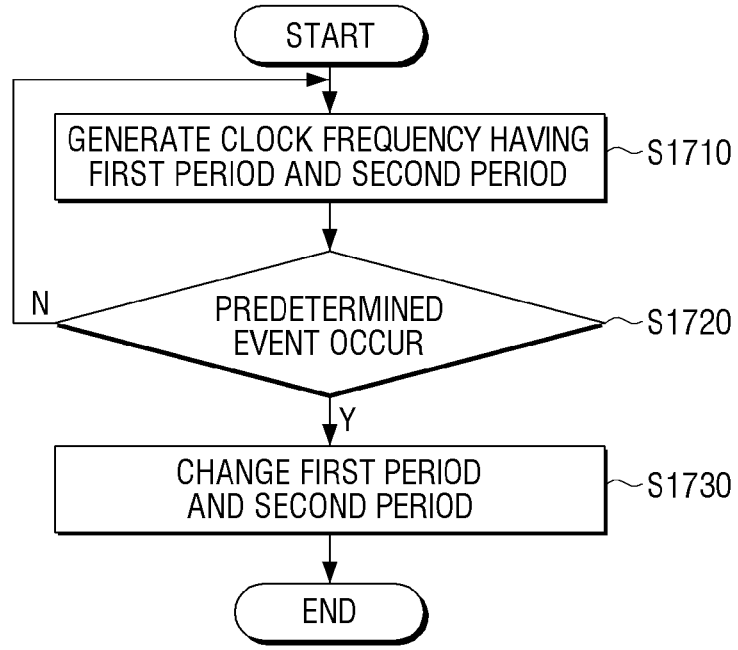
[Fig. 18]
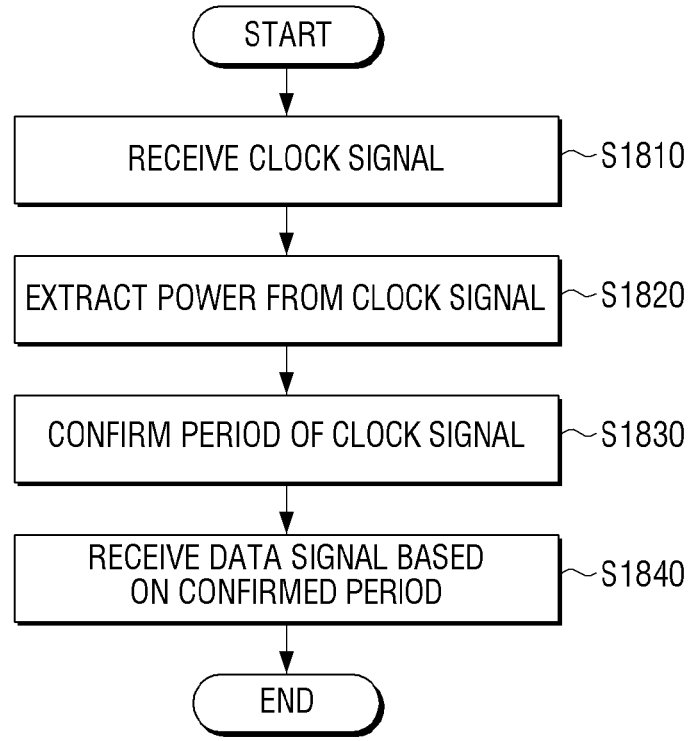

CRUM APPARATUS TO EXTRACT POWER FROM CLOCK SIGNAL HAVING FIRST AND SECOND PERIODS

BACKGROUND ART

Image forming apparatuses use ink or toner to print an image on a paper. The ink or toner is used every time an image forming job proceeds, and becomes exhausted when used for a predetermined time or more. In this case, an apparatus for storing the ink or toner needs to be newly replaced. Parts or components that may be exchanged during the use of the image forming apparatus are referred to as consumable apparatuses, consumable units, or replaceable apparatuses. For convenience of explanation, the term a consumable apparatus is used in the specification.

In the consumable apparatus, in addition to the apparatus which needs to be replaced since the ink or toner becomes exhausted as described above, there are apparatuses which are replaced due to the reason that characteristics are changed and good print quality may not be expected when used for a certain time. That is, in addition to a color-by-color developing device, parts such as an intermediate transfer belt may correspond to the consumable apparatus. Such a consumable apparatus needs to be replaced every appropriate replacement timing.

Recently, a CRUM (Customer Replacement Unit Monitoring) apparatus is used to allow a user to accurately determine replacement timing for each consumable apparatus.

DISCLOSURE OF INVENTION

BRIEF DESCRIPTION OF DRAWINGS

FIG. 1 is a block diagram showing an example configuration of an image forming apparatus of the disclosure;

FIG. 2 is a block diagram showing an example configuration of an image forming apparatus of the disclosure;

FIG. 3 is a diagram showing an example configuration of a print engine of FIG. 2;

FIGS. 4 and 5 are diagrams for explaining connection forms between image forming apparatuses and CRUM apparatuses;

FIG. 6 is a block diagram showing an example configuration of a CRUM apparatus of the disclosure;

FIGS. 7 to 9 are diagrams for explaining various implementation examples of control circuits;

FIG. 10 is a diagram for explaining an implementation example of a power extraction circuit shown in FIG. 6;

FIG. 11 is a diagram for explaining various signal transfer sections between an image forming apparatus and a CRUM apparatus;

FIG. 12 is a diagram for explaining various examples of waveforms according to a data signal, a clock signal, and a decoding signal;

FIGS. 13 to 16 are waveform diagrams for explaining an operation of changing a period of a clock signal;

FIG. 17 is a diagram for explaining an operation of an image reading apparatus of the disclosure; and FIG. 18 is a diagram for explaining an operation of a CRUM apparatus of the disclosure.

MODE FOR THE INVENTION

Hereinafter, various examples will be described in detail with reference to the drawings. The examples described below may be modified and implemented in various different forms. In order to more clearly describe the features of the examples, a detailed description of known matters will be omitted.

Meanwhile, in the specification, when an element is referred to as being "connected" with another element, it includes a case of being directly connected, as well as a case of being connected with another element in between. Also, when an element is referred to as "including" another element, it means that the element may not exclude another element but may further include other elements, unless specifically stated otherwise.

In the specification, the term "image forming job" may refer to various jobs (e.g., printing, scanning or faxing) related to an image, such as forming the image or generating/storing/transmitting an image file, and the term "job" may refer to the image forming job as well as a series of processes necessary for performing the image forming job.

Also, the term "image forming apparatus" refers to an apparatus that prints print data generated by a terminal apparatus such as a computer on a recording paper. Examples of such an image forming apparatus include a copier, a printer, a facsimile, or a multifunction printer (MFP) that combines functions thereof through a single apparatus. The image forming apparatus may refer to any apparatus capable of performing the image forming job, such as the printer, a scanner, a fax machine, the MFP, or a display apparatus.

Also, the term "hard copy" may refer to an operation of outputting an image to a print medium such as paper, and the term "soft copy" may refer to an operation of outputting an image to a display apparatus such as a TV or a monitor, etc.

Also, the term "content" may refer to all kinds of data that are targets of the image forming job, such as a photograph, an image, or a document file, etc.

Also, the term "print data" may refer to data converted into a printable format by the printer. Meanwhile, when the printer supports direct printing, the file itself may be print data.

Also, the term "user" may refer to a person who performs an operation related to the image forming operation using an image forming apparatus or a device connected with the image forming apparatus by a wired or wireless manner. The term "manager" may refer to a person who has authority to access all functions and systems of the image forming apparatus. The "manager" and the "user" may be the same person.

FIG. 1 is a block diagram showing an example configuration of an image forming apparatus 100 of the disclosure.

Referring to FIG. 1, the image forming apparatus 100 includes a processor 110 and a CRUM apparatus 200.

The processor 110 controls each element in the image forming apparatus 100. For example, when the processor 130 receives print data from a print control terminal apparatus (not shown), the processor 130 may control the print engine 300 such that the received print data is printed. Here, the print control terminal apparatus is an electronic apparatus that provides print data, and may be a PC, a notebook, a tablet PC, a smart phone, a server, and the like. The processor 110 may be a single apparatus such as a CPU, and may be a plurality of apparatuses such as a clock generating circuit, a CPU, a graphics processor, etc.

The processor 110 may communicate with the CRUM apparatus 200. For example, the processor 110 may perform communication for authentication of the CRUM apparatus 200 and management of data stored in the CRUM apparatus 200.

At this time, the processor 110 may communicate with the CRUM apparatus 200 by an I2C method or an eI2C method. The I2C method is a serial communication method using a data signal SDA and a clock signal Clock. The data signal is a signal for transmitting and receiving substantial information, and the clock signal is a synchronization signal for synchronizing transmission and reception timing of the data signal.

Meanwhile, in the I2C method, high values and low values of the clock signal are alternately repeated at a predetermined interval in a data section in which the data signal is transmitted and received and has no periodicity in a dormant section in which the data signal is not transmitted and received.

Here, the data section is a section in which data is transmitted and received between the CRUM apparatus 200 and the processor 110, and the dormant section is a section in which the data is not transmitted and received between the CRUM apparatus 200 and the processor 110 and includes an idle section and a pause section.

The idle section is a section for preparing data transmission in addition to a data transmission section, and the pause section refers to a section between a data section and another data section within the data transmission section. The data transmission section, the dormant section, the pause section and the idle section will be described in more detail with reference to FIG. 11.

Meanwhile, when power is extracted from the clock signal of the I2C method, stable power extraction becomes difficult in the dormant section. Therefore, in order for the CRUM apparatus to stably extract power from the clock signal, the clock signal has periodicity in the dormant section as well as the data section. Here, the dormant section is a section including the idle section and the pause section, and the eI2C method changes the I2C method such that the clock signal has such periodicity even in the dormant section. The eI2C method is a communication method in which the form of the clock signal is changed in the I2C method. The eI2C method has the clock signal in which the high values and the low values are alternately repeated even in the dormant section in which data is not transmitted and received.

For example, the clock signal according to the example according to eI2C has a first pulse width in the data section in which the data signal is transmitted and received, and a second pulse width different from the first pulse width in the dormant section in which data is not transmitted and received. In this case, the first pulse width may be larger than the second pulse width. Here, the first pulse width may be either a width of a high value width or a width of a low value.

Also, the clock signal may have different periods of the clock signal in the data section and the dormant section. For example, the clock signal has a waveform that in the dormant section, high values and low values are alternately repeated in a predetermined first time unit, and in the data section, the high values and the low values are alternately repeated in a second time unit that is set longer than the first time unit. Here, the high value may be 2V to 4V. Also, the low value may be greater than 0 but less than the high value or the low value may be 0.

Since the high values and low values of the clock signal are alternately changed even in the dormant section, the CRUM apparatus 200 may stably extract and use power from the clock signal without using a separate power terminal. An example connection method and operation of the eI2C method will be described later with reference to FIG. 4.

Meanwhile, in the example, a communication method of changing the clock signal of the I2C method is referred to as the eI2C method, but may be referred to as various names such as a 3-contact I2C method, an encoding I2C method, and the like.

The processor 110 may perform communication by performing encryption on the transmitted data. Various encryption algorithms such as RSA, ECC asymmetric key algorithm, ARIA, TDES, SEED, AES symmetric key algorithm and the like may be used as an encryption algorithm used at this time.

The processor 110 may generate the clock signal and generate and transmit or receive the data signal in order to perform communication with the CRUM apparatus 200 when communicating with the CRUM apparatus 200 through the eI2C method.

In the example, the clock signal in which the high values and the low values are alternately repeated in the data section as well as in the dormant section is generated and transmitted to the CRUM apparatus 200 such that the CRUM apparatus 200 may extract power through the clock signal. For example, the processor 110 may generate a clock signal in which high values and low values are alternately repeated in a first period in the data section and high values and low values are alternately repeated in a second period (or a second frequency) different from the first period in the dormant section and provide the clock signal to the CRUM apparatus 200.

Here, the first period may be 10 μs, and the second period may be 5 μs. The first period may be larger than the second period, and may have a value approximately twice larger than that of the second period. Meanwhile, the above-described numerical values are examples and may be changed according to an implementation method and application environment, and a difference between the first period and the second period may be applied differently.

Meanwhile, in the above-described example, the form of the clock signal is described using a period, but may be explained by a frequency having an inverse proportion to the period. That is, the clock signal may be referred to as a clock signal in which high values and low values are alternately repeated at a first frequency (for example, 100 kHz) in the data section and high values and low values are alternately repeated at a second frequency (for example, 200 kHz) in the dormant section.

When a predetermined event occurs, the processor 110 may change the first period and the second period. For example, in a section having much data communication with the CRUM apparatus 200 (for example, a section of performing authentication or when performing color printing, and when updating consumable data), the processor 110 may adjust the first period and the second period to be shorter for faster data communication. For example, in a process of authenticating the CRUM apparatus 200 (or the consumable apparatus), the processor 110 may change and use the first period (e.g., 10 μs) to a third period (e.g., 4 μs) faster than the first period, and change and use the second period (e.g., 5 μs) to a fourth period (e.g., 2 μs) faster than the second period.

To the contrary, when a communication error with the CRUM apparatus 200 occurs, the communication error repeats more than a predetermined number of times, or mono printing proceeds, the processor 110 may adjust the first period and the second period to be longer for stable data communication. For example, when the error occurs in communicating with the CRUM apparatus 200, the processor 110 may change and use the first period (e.g., 10 µs) to a fifth period (e.g., 18 µs) slower than the first period, and change and use the second period (e.g., 5 µs) to a sixth period (e.g., 9 µs) slower than the second period.

The first period and the second period described above may be adaptively changed in the implementation process. For example, communication may be performed in a default period (the first period and the second period), the default period may be changed to a faster period (the third period and the fourth period), and then the faster period may be changed to the default period or changed to a period (the fifth period or the sixth period) slower than the default period.

Meanwhile, the processor 110 may change the period (or the frequency) in the idle section and maintain the data signal in the idle section to have a constant value (for example, a high value). Since the data signal has the constant value in the idle section, the CRUM apparatus 200 may easily grasp whether a current section is the data section or the idle section based on a value of the data signal.

Also, the processor 110 may change a clock signal period of the dormant section (for example, change the second period to the fourth period or the sixth period) and proceed with the data section after a predetermined time (for example, 9 clock pulse signals) has elapsed such that the CRUM apparatus 200 may stably check a period change.

In the meantime, it is described that the processor 110 changes the period when a specific event occurs, but the processor 110 may determine whether it is necessary to change the period itself, and when it is necessary to change the period, may change the above-described period when implemented.

The processor 110 may perform an authentication procedure to determine whether the mounted CRUM apparatus 200 is a legitimate apparatus based on information provided by the CRUM apparatus 200. Also, the processor 110 may determine whether replacement of consumables is necessary based on the information (for example, consumable remaining amount information) provided by the CRUM apparatus 200.

The CRUM apparatus 200 extracts power using the clock signal provided from the processor 110 and operates using the extracted power. For example, the CRUM apparatus 200 includes a power extraction circuit for extracting power and may extract and use power from the clock signal by using the power extraction circuit. An example configuration and operation of the power extraction circuit will be described later with reference to FIG. 10.

When the second period of the clock signal is changed in the idle section, the CRUM apparatus 200 may communicate with the processor 110 in the first period corresponding to the changed second period in the data section after the idle section. Here, the changed first period may be twice the changed second period.

The CRUM apparatus 200 may store information about the consumable apparatus, information about the CRUM apparatus 200, or various characteristic information about the image forming apparatus 100 and usage information or programs related to performing of the image forming job.

For example, various programs stored in the CRUM apparatus 200 may include an O/S (Operating System) program, an encryption program, and the like as well as general applications. The characteristic information may also include information about a manufacturer of the consumable apparatus, information about a manufacturer of the image forming apparatus, a name of a mountable image forming apparatus, information about manufacturing date and time, a serial number, a model name, electronic signature information, an encryption key, an encryption key index, and the like. Also, the usage information may include information about how many sheets have been printed so far, how many remaining sheets may be printed, how much toner is remaining, and lifespan information such as a photoconductor, a developing roller, etc. that main components. The lifespan information of the photoconductor, the developing roller, and the like may be the number of revolutions of the photoconductor, the developing roller, and the like. The image forming apparatus may compare predetermined data generated through experiments with the above-described lifespan information and further control voltage and current and the like supplied to each component in the image forming apparatus, thereby producing high quality prints. The characteristic information may be otherwise referred to as unique information.

For example, information such as that described in the following table may be stored in the CRUM apparatus 200.

TABLE 1

| General Information | |
|---|---|
| OS Version | CLP300_V1.30.12.35 |
| SPL-C Version | 02-22-2007 |
| Engine Version | 5.24 06-28-2006 |
| USB Serial Number | 6.01.00(55) |
| Set Model | BH45BAIP914466B. |
| Service Start Date | DOM |
| | 2007-09-29 |
| Option | |
| RAM Size | 32 Mbytes |
| EEPROM Size | 4096 bytes |
| USB Connected (High) | |
| Consumables Life | |
| Total Page Count | 774/93 Pages(Color/mono) |
| Fuser Life | 1636 Pages |
| Transfer Roller Life | 864 Pages |
| Tray1 Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 |
| | Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust(CMYK: 0, 0, 0, 0) |
| Setup Menu | |
| Power Save | 20 Minutes |
| Auto Continue | On |
| Altitude Adj. | Plain |

As shown in the above table, a memory of the CRUM apparatus 200 may store general information about the consumable apparatus, as well as information about the lifespan of the consumable, information, a setup menu, and the like. Also, the O/S provided for use in the CRUM apparatus 200 itself may be stored in the memory separately from the main body of the image forming apparatus.

In addition, the CRUM apparatus 200 may further include a CPU (not shown) capable of managing the memory, executing various programs stored in the memory, and communicating with the main body of the image forming apparatus or a controller of another apparatus.

Meanwhile, the CRUM apparatus 200 may be mounted on the consumable apparatus and connected to the processor 110 of the image forming apparatus, or may be connected to the processor 110 in the manner of being mounted on the image forming apparatus separately from the consumable apparatus.

The example configuration and operation of the CRUM apparatus 200 will be described with reference to FIGS. 6 to 10, and the connection between the CRUM apparatus 200 and the processor 110 will be described later with reference to FIGS. 4 and 5.

While a simple configuration of the image forming apparatus is shown and described above, various configurations may be additionally provided when implemented. This will be described below with reference to FIG. 2.

FIG. 2 is a block diagram showing an example configuration of the image forming apparatus 100 of the disclosure.

Referring to FIG. 2, the image forming apparatus 100 may include the processor 110, a communication apparatus 120, a memory 130, a display 140, an operation input part 150, and a print engine 300 including the CRUM apparatus 200.

The processor 110 and the CRUM 200 apparatus are described with reference to FIG. 1, and redundant descriptions thereof will be omitted.

The communication apparatus 120 is connected to a print control terminal apparatus (not shown), and receives print data from the print control terminal apparatus. For example, the communication apparatus 120 is formed to connect the image forming apparatus 100 to an external apparatus, and may be connected to a terminal apparatus via a local area network (LAN) and the Internet network as well as via universal serial bus (USB) port or a wireless communication (e.g., WiFi 802.11a/b/g/n, NFC, Bluetooth) port. Such a communication apparatus 120 may be referred to as a transceiver.

Meanwhile, it is described in FIG. 1 that the processor 110 is directly connected to the CRUM apparatus 200, but the processor 110 may communicate with the CRUM apparatus 200 through the communication apparatus 120 when implemented. In this case, the communication apparatus 120 may generate a clock signal corresponding to a control value of the processor 110 and provide the clock signal to the CRUM apparatus 200.

When it is determined that the replacement of the consumables is necessary, the communication apparatus 120 may notify a management server (not shown) or a manager (for example, a terminal apparatus of the manager) of information about this.

The memory 130 stores the print data. For example, the memory 130 stores the print data received through the communication apparatus 120. The memory 130 stores history information of a print job performed by the image forming apparatus 100.

The memory 130 may store information about a period (or a frequency) used for communication with the CRUM apparatus 200. For example, the memory 130 stores information about a first period and a second period in a default state, information about third and fourth periods used in an authentication state, and information about fifth and sixth periods used when an error occurs, and the like. The memory 130 may store the information about the period as information about a calculation formula or a ratio, not a specific value when implemented.

Meanwhile, the memory 130 may be implemented as a storage medium in the image forming apparatus 100 and an external storage medium, for example, a removable disk including a USB memory, or a Web server through a network.

The display 140 displays various kinds of information provided by the image forming apparatus 100. For example, the display 140 may display a user interface window for receiving various functions provided by the image forming apparatus 100. The display 140 may be a monitor such as an LCD, a CRT, or an OLED, etc. or may be implemented as a touch screen capable of simultaneously performing functions of the operation input part 150, which will be described later.

The display 140 may display a control menu for performing functions of the image forming apparatus 100.

The display 140 may display information about consumables. For example, when it is determined that replacement of the consumables is necessary, the display 140 may display replacement information and display a predicted replacement time.

The operation input part 150 may receive control instructions with respect to a function selection and a corresponding function from a user. Here, the function may include a print function, a copy function, a scan function, a fax transmission function, and the like. Such function control instructions may be input through the control menu displayed on the display 140.

The operation input part 150 may be implemented as a plurality of buttons, a keyboard, a mouse, and the like, or may be implemented as the touch screen capable of simultaneously performing the functions of the display 140 described above.

The print engine 300 forms an image. For example, the print engine 300 may form an image on an image forming medium on which the image is formed, such as a photosensitive drum, an intermediate transfer belt, and a sheet conveyance belt.

The print engine 300 may include various consumable apparatuses that directly or indirectly participate in an image forming job. For example, in the case of a laser image forming apparatus, a charging apparatus, an exposure apparatus, a developing apparatus, a transferring apparatus, a fixing apparatus, various rollers, a belt, an OPC drum and the like may be consumable apparatuses. In addition, to use the image forming apparatus, various types of apparatuses which are replaceable, such as the developing apparatus (e.g., a developing cartridge or a toner cartridge, etc.), may be defined as consumable apparatuses.

The CRUM apparatus 200 may be mounted on the above-described consumable apparatus, or may be mounted in the image forming apparatus 100 spaced apart from the consumable apparatus.

As described above, the image forming apparatus 100 according to the example may increase or decrease a communication speed as needed when the processor 110 and the CRUM apparatus 200 perform communication. Accordingly, the image forming apparatus 100 may perform faster authentication for the consumable apparatus or perform stable communication even when an error occurs.

Meanwhile, it is shown and described in FIGS. 1 and 2 that one CRUM apparatus is included in the image forming apparatus 100, but the image forming apparatus 100 may include a plurality of CRUM apparatuses. In this case, the plurality of CRUM apparatuses may operate using a single clock signal or may respectively operate using clock signals that operate in different periods.

FIG. 3 is a diagram showing an example configuration of the print engine 300 of FIG. 2.

Referring to FIG. 3, the print engine 300 may include a photosensitive drum 301, a charging device 302, an exposure device 303, a developing device 304, a transfer device 305, and a fixing device 308.

An electrostatic latent image is formed on the photosensitive drum 301. The photosensitive drum 301 may be referred to as a photosensitive drum, a photosensitive belt or the like depending on its form.

Hereinafter, the configuration of the print engine 300 corresponding to one color will be described for the sake of easy explanation, but the print engine 300 may include a plurality of photosensitive drums 301, a plurality of charging devices 302, a plurality of exposure devices 303, and a plurality of developing devices 304 corresponding to a plurality of colors when implemented. In this case, an intermediate transfer belt for forming an image formed on the plurality of photosensitive drums 301 on one printing paper may be further provided.

The charging device 302 charges a surface of the photosensitive drum 301 to a uniform potential. The charging device 302 may be implemented in the form of a corona charging device, a charging roller, a charging brush, or the like.

The exposure device 303 changes the surface potential of the photosensitive drum 301 according to image information to be printed, thereby forming the electrostatic latent image on the surface of the photosensitive drum 301. As an example, the exposure device 303 may form the electrostatic latent image by irradiating the photosensitive drum 301 with light modulated according to the image information to be printed. The exposure device 303 of this type may be referred to as a light scanner or the like, and an LED may be used as a light source.

The developing device 304 accommodates a developer therein, and supplies the developer to the electrostatic latent image to develop the electrostatic latent image into a visible image. The developing device 304 may include a developing roller 307 for supplying the developer to the electrostatic latent image. For example, the developer may be supplied from the developing roller 307 to the electrostatic latent image formed on the photosensitive drum 301 by a developing electric field formed between the developing roller 307 and the photosensitive drum 301.

The visible image formed on the photosensitive drum 301 is transferred to a recording medium P by the transfer device 305 or an intermediate transfer belt (not shown). The transfer device 305 may transfer the visible image to the recording medium P by, for example, an electrostatic transfer method. The visible image is attached to the recording medium P by electrostatic attraction.

The fixing device 308 applies heat and/or pressure to the visible image on the recording medium P to fix the visible image on the recording medium P. A printing job is completed by this series of processes.

The above-described developer is used every time the image forming job proceeds and becomes exhausted when used for a predetermined time or more. An apparatus (for example, the above-described developing device 304 itself) for storing the developer is newly replaced.

Further, the photosensitive drum 301 is aged every time the image forming job proceeds, and when the photosensitive drum 301 is used for a predetermined time or more, the photosensitive drum 301 itself is replaced.

The parts or components that may be replaced during the use of the image forming apparatus 100 are referred to as consumable apparatuses or replaceable apparatuses. The CRUM apparatus 200 described above may be attached to the consumable apparatus for proper management of the consumable apparatus.

Hereinafter, a connection form between the CRUM apparatus 200 mounted on the consumable apparatus and the processor 110 will be described.

FIGS. 4 and 5 are respectively diagrams for explaining connection forms between the image forming apparatus 100 and the CRUM apparatus 200

For example, FIG. 4 is a diagram for explaining a form in which the image forming apparatus 100 and the CRUM apparatus 200 are connected in 3 contact points.

Referring to FIG. 4, a main body of the image forming apparatus 100 is provided with the communication apparatus 120 (or terminals) to be connected to the CRUM apparatus 200, and the CRUM apparatus 200 is disposed in a consumable apparatus.

The main body (or the communication apparatus 120) of the image forming apparatus 100 is provided with terminals 161, 162, and 163 for communication with the CRUM apparatus 200. The terminals 161, 162, and 163 are connected to the terminals of the CRUM apparatus 200 through cables 171, 172, and 173, respectively. In the illustrated example, the terminals 161, 162, and 163 are included in the communication apparatus 120, but they may be terminals directly connected to the processor 110.

The CRUM apparatus 200 includes terminals 231, 232, and 233 for communication with the processor 110 included in the image forming apparatus 100. The terminals 231, 232, and 233 may include a clock terminal 231, a data terminal 232, and a ground terminal 233.

The clock terminal 231, the data terminal 232 and the ground terminal 233 are electrically connected to the three terminals 161, 162, and 163 provided in the main body of the image forming apparatus 100 via the cables 171, 172, and 173.

In the illustrated example, the terminals 161, 162, and 163 are connected via the cables 171, 172, and 173, but they may be directly connected to each other when implemented. In the illustrated example, the CRUM apparatus 200 is attached to the consumable apparatus, but the CRUM apparatus 200 and the consumable apparatus may be mounted on the image forming apparatus 100 at positions spaced apart from each other.

Meanwhile, in explaining FIG. 4, the image forming apparatus 100 and the CRUM apparatus 200 include the three terminals 161, 162, 163, 231, 232, and 233, respectively, but the image forming apparatus 100 and the CRUM apparatus 200 may further include power terminals. That is, the image forming apparatus 100 and the CRUM apparatus 200 may each include four terminals. Such an example will be described below with reference to FIG. 5.

FIG. 5 is a diagram for explaining a form in which the image forming apparatus 100' and the CRUM apparatus 500 are connected in 4 contact points.

Referring to FIG. 5, the image forming apparatus 100' includes a main body 610, a consumable apparatus 400 that may be mounted on the main body 610, and the CRUM apparatus 500.

When the consumable apparatus 400 on which the CRUM apparatus 500 is mounted on the main body 610 of the image forming apparatus 100', the CRUM apparatus 500 may communicate with the processor 110 of the image forming apparatus 100' via the consumable apparatus 400. Meanwhile, the CRUM apparatus 500 may be directly connected to the main body 610 without passing through the consumable apparatus 400 when implemented.

The processor 110 is electrically connected to the consumable apparatus 400 through four terminals 631, 632, 633 and 634 provided on the main body 610 and cables 621, 622, 623 and 624 respectively connected to the terminals 631, 632, 633 and 634.

The consumable apparatus 400 also includes four terminals 531, 532, 533, and 534 that are in contact with the four terminals 631, 632, 633, and 634 in the main body 610.

According to an example, the four terminals 631, 632, 633, and 634 included in the main body 610 may be a clock terminal, a data terminal, a power terminal, and a ground terminal, respectively. Similarly, the four terminals 531, 532, 533, and 534 included in the consumable apparatus 400 may also be a clock terminal, a data terminal, a power terminal, and a ground terminal, respectively.

For example, the clock terminal 531 of the consumable apparatus 400 may be connected to the clock terminal 632 included in the main body 610 of the image forming apparatus 100' to receive a clock signal. The data terminal 532 of the consumable apparatus 400 may be connected to the data terminal 632 included in the main body 610 to transmit and receive data signals. The power terminal 533 of the consumable apparatus 400 may be connected to the power terminal 633 included in the main body 610 and the ground terminal 534 of the consumable apparatus 400 may be connected to the ground terminal 634 included in the main body 610.

At this time, the power terminal 633 included in the main body 610 of the image forming apparatus 100' may be kept in an inactive state. For example, the image forming apparatus 100' standardized with the four terminals 631, 632, 633 and 634 may not use the CRUM apparatus 200 shown in FIG. 4.

Therefore, the main body 610 of the image forming apparatus 100' includes the four terminals 631, 632, 633 and 634 according to the standard of the image forming apparatus 100' while the power terminal 633 may be in an electrically non-conductive state. Here, the non-conductive state may be a form in which power is not supplied to the power terminal 633 from the main body 600 side, and one of four-wire cables is short-circuited, or the power terminal 633 and the cable 623 both supply power, but the power terminal 533 may not be used on the CRUM apparatus 200 side.

Also, the consumable apparatus 400 may also be standardized with four terminals corresponding to the image forming apparatus 100'. Thus, the consumable apparatus 400 may also include the four terminals 531, 532, 533, and 534.

Meanwhile, it is common that each of an image forming apparatus and a consumable apparatus which are currently commercialized includes four terminals including a clock terminal, a data terminal, a power terminal and a ground terminal. Therefore, when a protocol related to a clock signal stored in the processor 110 of the currently commercialized image forming apparatus is changed or updated, the CRUM apparatus 500 according to the example may be mounted and used. Therefore, the existing CRUM apparatus and the CRUM apparatus 500 may be compatible with each other.

FIG. 6 is a block diagram showing a simple configuration of the CRUM apparatus 200 of the disclosure.

Referring to FIG. 6, the CRUM apparatus 200 includes a power extraction circuit 210 and a control circuit 220.

The power extraction circuit 210 receives a clock signal from an image forming apparatus and extracts power from the received clock signal. That is, the power extraction circuit 210 may supply power by charging a capacitive element (for example, a capacitor) when the clock signal has a high value. An example power extraction operation will be described later with reference to FIG. 10.

A power extraction method may be implemented in various ways depending on a waveform of the clock signal. Also, the waveform of the clock signal may vary depending on a data section in which a data signal is transmitted and received, and a pause section in which the data signal is not received.

The clock signal may have a clock waveform of a pattern in which high values and low values are alternately repeated in a predetermined pattern in the pause section.

That is, the clock signal may maintain the clock waveform even in the pause section. In this case, the clock signal in the data section has a first pulse width, and the clock signal in the pause section has a second pulse width different from the first pulse width. Here, the first pulse width may be larger than the second pulse width.

Also, a period (i.e., a first clock period) of the clock signal in the data section and a period (i.e., a second clock period) of the clock signal in the pause section may be different from each other. Meanwhile, when a duty ratio is the same, and the period of the clock signal in the data section is different from the period of the clock signal in the pause section, the first pulse width in the data section and the second pulse width in the pause section may be different as described above.

In this case, it is assumed that the duty ratios in the first clock period and the second clock period are the same, but the duty ratio in the data section and the duty ratio in the pause section may be different when implemented, and the duty ratios may be different within a predetermined range in the same data section. For example, a high hold time and a low hold time of the clock signal having the second pulse width may be different from each other in a range in which each pause time is smaller than a first time (a reference time used for determining whether it is the data section or the dormant section). And each of a high hold time and a low hold time of the clock signal having the first pulse width may be different in a range in which a hold time is larger than the first time.

For example, the clock signal has high values and low values alternately repeated in a predetermined first time unit in the pause section and high values and low values are alternately repeated in a second time unit set longer than the first time in the data section. Here, the high value may be 2V to 4V. The low value may also be 0.

According to this example, since the clock signal includes the high value in the pause section and the data section, the CRUM apparatus 200 may be driven by extracting power from the high value of the clock signal in the pause section and the data section. Particularly, since the high and low values of the clock signal are repeated in the first clock period in the pause section, the CRUM apparatus 200 may be driven continuously without power interruption by repeatedly extracting power from the high value. That is, in the I2C communication method according to the related art, since the clock signal maintains a low value in the pause section between data and data, the IC is malfunctioned due to the discharge of a capacitor according to a software operation state, or a reset phenomenon occurs due to the power drop and an image forming apparatus accesses from the beginning due to temporary storage data and authentication data loss, and thus an operation of the image forming apparatus may be delayed. Also, since a CRUM apparatus may be damaged due to frequent resetting, it has been difficult to actually apply the technique of charging the capacitor with the clock signal and using the capacitor as a power source.

Further, when power is extracted from the data signal, since there is a possibility that the data may have a continuous low value, the malfunctions, reset phenomenon, operation delays, and damage to the CRUM as described above may occur.

The control circuit 220 is activated by the power extracted by the power extraction circuit 210. The control circuit 220 may transmit and receive data to and from the image forming apparatus via the data terminal 222 in accordance with the clock signal.

The control circuit 220 has a timer for measuring frequency (or the hold time of the high value and the low value) of a clock, and may determine an idle section and a data transmission section according to a value of the clock signal measured by the timer. For example, the control circuit 220 may distinguish between the data transmission section and the idle section by determining a transmission and reception time and an end time of the data signal based on the clock signal.

For example, the CRUM apparatus 200 and the image forming apparatus are normally connected in a standby state and connected in an active state in order to transmit and receive the data signal. To this end, the clock signal may include a signal section for informing the CRUM apparatus 200 of the start of reception of the data signal.

Accordingly, when the high and low values of the clock signal are alternately repeated in the first time unit in the idle section and a section in which the low value of the clock signal is maintained exceeds the first time, the control circuit 220 may determine a time (A in FIG. 11) when the first time elapses as the transmission and reception start time of the data signal.

When the transmission and reception of the data signal between the CRUM apparatus 200 and the image forming apparatus are completed, the CRUM apparatus 200 and the image forming apparatus end the active state and are connected in the standby state. Accordingly, the clock signal may include a signal section for informing the CRUM apparatus 200 of the transmission and reception start end time of the data signal.

Accordingly, when the high and low values of the clock signal are alternately repeated in the second time unit in the data section and a section in which the high value of the clock signal is maintained exceeds the second time, the control circuit 220 may determine the time at which the second time is exceeded as the transmission and reception end point of the data signal.

As another example, when the high and low values of the clock signal are alternately repeated in the first time unit in the pause period and the interval in which the high value of the clock signal is maintained exceeds the second time, the control circuit 220 may determine a time (D" in FIG. 12) when the second time elapses as the transmission and reception end time of the data signal.

Meanwhile, a section from the transmission and reception start time of the data signal to the transmission and reception end time of the data signal may be defined as an entire data transmission section, which may include a pause section (a first pause section BC in FIG. 12) during data transmission and reception.

When the clock signal is received, the control circuit 220 may check the clock signal to determine a section change time from the pause section to the data section or from the data section to the pause section.

For example, when the clock signal is received, the control circuit 220 determines that the pause section is changed to the data section when the high and low values of the clock signal are alternately repeated in the pause section, and a section during which either the high value or the low value is maintained exceeds the first time.

Also, the control circuit 220 determines that the data section is changed to the pause section when the high and low values of the clock signal are alternately repeated in the data section, and the section during which either the high value or the low value is maintained has the first time.

When it is determined that the pause section is changed to the data section, the control circuit 220 may transmit and receive the data signal transmitted and received during the data section through the data terminal 222. In the data section, a predetermined data signal may be transmitted from the CRUM apparatus 200 to the image forming apparatus.

Then, the control circuit 220 detects whether an operating speed is variable in the idle section. For example, the control circuit 220 may detect a change in the second period of the clock signal in the idle section, and when the changed second period is maintained for a predetermined time (for example, the time of 9 clock pulse signals), detect that the operating speed is variable.

When the operating speed is variable, the control circuit 220 may change the first time described above to a time value corresponding to the changed second period and in a next data transmission section, determine whether it is the data section or the pause section using a value of the changed first time.

The control circuit 220 may manage internal information according to the data signal transmitted and received. That is, the control circuit 220 may store the received data signal, read previously stored data, and transmit the data signal to the image forming apparatus.

At this time, the control circuit 220 may perform communication by performing encryption on data to be transmitted and received. Various encryption algorithms such as RSA, ECC asymmetric key algorithm, ARIA, TDES, SEED, AES symmetric key algorithm and the like may be used as an encryption algorithm used at this time.

The control circuit 220 controls the CRUM apparatus 200 using the extracted power. The control circuit 220 may be one integrated circuit (IC) or a plurality of apparatuses. An example of the control circuit 220 as one IC will be described later with reference to FIG. 7, and an example of the control unit 220 as a plurality of ICs will be described later with reference to FIGS. 8 and 9.

As described above, the CRUM apparatus 200 according to the example may be activated without a power terminal by extracting power from the clock signal received by the CRUM apparatus 200 through the clock terminal 221.

Also, since the CRUM apparatus 200 does not need to have an interface for connecting to a power terminal of the main body, the cost of the CRUM apparatus 200 may be reduced by reducing the size of the CRUM apparatus 200 and the number of interfaces. Also, since the CRUM apparatus 200 does not include the power terminal, a circuit for controlling the power terminal is not necessary, and thus the circuit configuration may be simplified.

Also, the CRUM apparatus 200 may detect a change in a communication speed through a change in a clock frequency, and thus adaptive communication may be possible.

FIGS. 7 to 9 are diagrams for respectively explaining various implementation examples of control circuits 220, 220', and 220".

For example, FIG. 7 is a diagram showing a configuration of the CRUM apparatus 200 in a case where the control circuit 220 is one IC.

Referring to FIG. 7, the CRUM apparatus 200 includes the power extraction circuit 210, the control circuit 220, and a plurality of terminals 230.

The plurality of terminals 230 are connected to the plurality of terminals 161, 162, and 163 provided in a main body of an image forming apparatus. For example, the plurality of terminals 230 may include the clock terminal 231, the data terminal 232, and the ground terminal 233. The body may be a substrate on which the processor 110, the communication apparatus 120, or the processor 110 and the communication apparatus 120 is/are mounted.

The clock terminal 231 may be electrically and physically connected to the clock terminal 161 of the main body.

The data terminal 232 may be electrically and physically connected to the data terminal 161 of the main body. And the ground terminal 233 may be electrically and physically connected to the ground terminal 163 of the main body. Meanwhile, it is illustrated above that the plurality of terminals 230 are three terminals, but they may be implemented as 4 terminals as shown in FIG. 5.

The power extraction circuit 210 extracts power from a clock signal when the clock signal is received through the clock terminal 231 of the main body.

The control circuit 220 is activated by the power extracted by the power extraction circuit 210. A detailed operation of the control circuit 220 is the same as that of FIG. 6, and a redundant description thereof is omitted.

FIG. 8 is a diagram showing an example in which the control circuit 220' is 2 ICs.

Referring to FIG. 8, a CRUM apparatus 200' includes the power extraction circuit 210, the control circuit 220', and the plurality of terminals 230.

The configurations of the power extracting circuit 210 and the plurality of terminals 230 are the same as those in FIG. 7, and redundant descriptions thereof are omitted.

The control circuit 220' includes a processor 221 and a memory 225.

The processor 221 is activated by power extracted by the power extraction circuit 210. The processor 221 may transmit and receive data to and from an image forming apparatus via the data terminal 232 in accordance with a clock signal.

The processor 221 may determine an idle section and a data transmission section.

The processor 221 may determine a change from the pause section to the data section and from the data section to the pause section. Also, the processor 221 may detect a change in an operating speed in the idle section. A determination operation and speed change detection are the same as those of the control circuit 220 of FIG. 6 and will not be described in detail.

The processor 221 may manage the memory 225 according to data signal transmitted and received. That is, the processor 221 may store the received data signal in the memory 225, read data stored in the memory 225, and transmit the data signal to the image forming apparatus.

FIG. 9 is a diagram showing an example in which the control circuit 220" is 3 ICs.

Referring to FIG. 9, a CRUM apparatus 200" includes the power extraction circuit 210, the control circuit 220", and the plurality of terminals 230.

The configurations of the power extracting circuit 210 and the plurality of terminals 230 are the same as those in FIG. 7, and redundant descriptions thereof are omitted.

The control circuit 220" includes an interface IC 222, a processor 223, and the memory 225.

The interface IC 222 is activated by power extracted by the power extraction circuit 210. The interface IC 222 transmits and receives data using the data terminal 232 in accordance with a clock signal.

First, when the clock signal is received through the clock terminal 231, the interface IC 222 may check the clock signal to determine a section change time when an idle section is changed to a data section or the data section is changed to the idle section.

For example, the interface IC 222 determines that the idle section is changed to the data section when high and low values of the clock signal are alternately repeated in the idle section and a section in which one of the high and low values is maintained exceeds a first time.

Also, the interface IC 222 determines that the data section is changed to the idle section when the high and low values of the clock signal are alternately repeated in the data section and the section in which one of the high and low values is maintained has the first time.

The interface IC 222 may receive the data signal received during the data section through the data terminal 232 when the interface IC 222 determines that the idle section is changed to the data section. In the data section, a predetermined data signal may be transmitted and received from the CRUM apparatus 200 to the image forming apparatus.

Meanwhile, the processor 223 may be activated by power and may manage the memory 225 in accordance with the data signal transmitted and received by the interface IC 222. That is, the processor 223 may store the data signal received from the interface IC 222 in the memory 225, read data stored in the memory 225, and transmit and receive the data signal to and from the image forming apparatus.

It is described above that the interface IC 223 performs an operation of determining the data section or the pause section based on the clock signal, but the interface IC 222 may perform a function of decoding an eI2C clock signal to a second clock signal in the form of I2C when implemented.

For the above-described operation, the interface IC 223 may receive a first clock signal generated by a main body of the image forming apparatus 100 via the clock terminal 231 and convert the received first clock signal to the second clock signal. For example, the interface IC 223 may alternately convert an output value of the second clock signal in a time unit corresponding to a first frequency at a time when a section in which any one of the high and low values is maintained exceeds a predetermined time (e.g. T_Chang) when the section exceeds the predetermined time, and may maintain the output value of the second clock signal when the section in which any one of the high and low values is maintained is less than or equal to the predetermined time.

When such an operation is performed by the interface IC 223, the CRUM apparatus 200 may be implemented using a general-purpose memory IC.

FIG. 10 is a diagram for explaining an implementation example of the power extraction circuit 210 shown in FIG. 6.

Referring to FIG. 10, the power extraction circuit 210 extracts power from a clock signal and may include a diode 211 and a capacitor 212.

The diode 211 is connected to the clock terminal 231 and receives the clock signal from the clock terminal 231. The diode 211 may pass a clock signal having a high value in each of an idle section and a data section.

The capacitor 212 may be charged by the clock signal passed in the diode 211. Accordingly, the CRUM apparatus 200 may operate using the power charged in the capacitor 212.

Meanwhile, it is described above that the diode 211 passes the clock signal having the high value in each of the idle section and the data section, but is not limited thereto. For example, the power extraction circuit 210 may be embodied using a switching element that on/off switches according to the clock signal and a capacitor.

FIG. 11 is a diagram for explaining various signal transfer sections between an image forming apparatus and the CRUM apparatus 200.

Referring to FIG. 11, a waveform diagram of the data signal SDA and the clock signal CLOCK is shown.

The data signal SDA may be a signal for transmitting data stored in the CRUM apparatus 200 to a main body or a signal of information to be transmitted to the main body and stored in the CRUM apparatus 200. An actual transmission section of the information is a data transmission section. And a section where the information is not transmitted is an idle section.

For example, the main body of the image forming apparatus and the CRUM apparatus 200 need not always be connected. Accordingly, when the main body 100 needs to communicate with the CRUM apparatus 200, the main body generates a clock signal and provides it to the CRUM apparatus 200. In this regard, the idle section described above may be referred to as a section for preparing data transmission, and the data transmission section may be referred to as a section for performing data transmission. Meanwhile, a pause section described above is a section between a data section and another data section in the data transmission section. An example clock waveform in one data transmission section will be described later with reference to FIG. 12.

The clock signal CLOCK is a signal used to determine transmission and reception of the data signal. In a region where the data signal is not normally transmitted and received, the clock signal CLOCK is not transmitted from the main body to the CRUM apparatus 200. However, in the example, the clock signal CLOCK is used to supply power of the CRUM apparatus, and thus the clock signal may be generated and transmitted to the CRUM apparatus 200 even in a section in which data is not transmitted. Accordingly, in the pause section as well as in the idle section, a clock signal having a different pulse width from the data section may be provided to the CRUM apparatus 200.

For example, when an access to the CRUM apparatus 200 becomes unnecessary, for example, when the image forming apparatus enters a power saving mode or becomes in a power off state, the main body may change the clock signal CLOCK to 0.

FIG. 12 is a diagram for explaining various examples of waveforms according to a data signal, a clock signal, and a decoding signal.

Referring to FIG. 12, the clock signal may have different clock waveforms and may have different pulse widths in a pause section and a data section. For example, the clock signal may have a first pulse width in the data section and a second pulse width different from the first pulse width in an idle section. In this case, the first pulse width may be larger than the second pulse width.

Meanwhile, in a first idle section, the clock signal has a waveform in which high and low values are alternately repeated in a first time t1 unit. A CRUM apparatus may extract power from a high value received during the first time t1 in this first idle section. Here, the low value may be 0V and the high value may be 3.3V. However, the low value and the high value are not limited thereto, and may vary depending on a model or specification of an image forming apparatus.

In the first idle section, the data signal does not include substantial data. However, in the first idle section, the data signal may have a waveform having a value of either the high value or the low value, and the waveform of the data signal in the first idle section may be arbitrarily determined. This is also the same for other idle sections.

Meanwhile, in the first idle section, when the high and low values of the clock signal are alternately repeated in the first time t1 unit, and a section in which the low value of the clock signal is maintained exceeds the first time t1, the CRUM apparatus may determine the section exceeding the first time t as a transmission and reception start time A of the data signal. Here, the transmission and reception start time A of the data signal may be a time when it is notified that the data signal is received from the image forming apparatus.

The first idle section may be changed to the first data section with respect to the transmission and reception start time A. In this case, the clock signal has a waveform in which the high and low values are alternately repeated in accordance with a second time t2 set longer than the first time t1.

Here, the second time t2 may be twice the first time t1, but is not limited thereto. The second time t2 may be a time t for extracting sufficient power from the high value of the clock signal to drive the CRUM apparatus for one period. When the second time t2 is shorter than the time t, the CRUM apparatus is powered down and may not be driven. Therefore, the second time t2 may be set to have a time equal to or longer than the time t.

Meanwhile, when the high and low values of the clock signal are alternately repeated in the first data section and the high value of the clock signal has the first time t1, the CRUM apparatus may determine a time when the high value of the clock signal has the first time t1 as a first section change time B that is changed to a first pause section.

Meanwhile, since the time that is changed to the first pause section is different from a time that is changed to an idle section, which will be described later, when the high and low values of the clock signal are alternately repeated in the first data section in the second time t2 and the high value of the clock signal has the first time t1, the CRUM apparatus may recognize that the data section will continue after the pause section. Therefore, the CRUM apparatus may continuously maintain a connection state with the image forming apparatus in an activation state.

Meanwhile, in the first pause section, the clock signal has a waveform in which the high and low values are alternately repeated in the first time t1 period.

When the high and low values are alternately repeated in the first pause section and a section in which the high value of the clock signal is maintained exceeds the first time t1, the CRUM apparatus may determine that a second data section starts at a time when the section exceeds the first time t1. Therefore, the CRUM apparatus may determine the time at which the high value of the clock signal exceeds the first time t1 as a second section change time C.

In the second data section, the clock signal has a waveform in which the high and low values are alternately repeated at the second time t2 period. In the second data section, when the high and low values of the clock signal are alternately repeated, and the high value of the clock signal has the first time t1, the CRUM apparatus may recognize that a second pause section will follow after the second data section.

Accordingly, the CRUM apparatus may recognize the time when the high value of the clock signal becomes the first time t1 as a third section change time D, which is changed back to the second pause section.

Meanwhile, in the second pause section subsequent to the second data section, the clock signal has a waveform in which the high and low values are alternately repeated at the first time t1 period. When the time when the high value of the clock signal is maintained exceeds the second time t2, the CRUM apparatus may recognize the time when the high value exceeds the second time t2 as a reception end time D" of the data signal.

The CRUM apparatus and the image forming apparatus are connected in a standby state on the basis of the reception end time D", and a reception operation of the data signal may end. When the CRUM apparatus is connected to the image forming apparatus in the standby state, since the data signal is not received from the image forming apparatus, the second pause section is changed to a second idle section.

In FIG. 12, it is described that the pause section and the data section each include two sections, but is not limited thereto. When an amount of data to be transmitted and received is large, the second pause section and the second data section may repeatedly include three or more times. As another example, when the amount of data to be transmitted and received is small, the second pause section and the second data section may not be included.

As described above, since the data transmission and reception time is made with a length of the clock signal, the second time t2, which is the clock signal length of a data effective section, may be maintained longer than the first time t1, and the data transmission and reception time may be determined as a time exceeding the first time for stable data transmission and reception.

It is described above that lengths of low and high sections of the clock signal are the same for the sake of convenience, but the lengths of low and high sections of the clock signal may be different in a range in which each of the lengths of low and high sections is less than or equal to the first time t1 in the pause section and in a range in which each of the lengths of low and high sections is equal to or greater than the second time t2 in the data section.

Meanwhile, the CRUM apparatus may decode the data signal based on the clock signal and generate a decoding signal as a result of decoding. This decoding operation may be performed by an interface controller included in the CRUM apparatus.

Referring to FIG. 12, when the clock signal having high and low values are changed in the first time t1 unit as in the first idle section, the first pause section and the second pause section is received, since the data signal is not received, a constant decoding signal is generated with a value of either "0" or "1". When the clock signal having high and low values exceeding the first time t1 is received as in the first data section and the second data section, the data section may be recognized.

Therefore, in the first data section and the second data section, a decoding signal having a waveform in "0" or "1" are repeated alternately at each time when the high and low values of the clock signal exceed the first time t1.

As a result, the decoding signal shown in FIG. 12 has a waveform in which one of "0" and "1" is maintained constant in the first idle section, the first pause section and the second pause section, and "0" and "1" are alternately repeated according to the second time t2 in the first data section and the second data section.

Meanwhile, in FIG. 12, it is described that the low value included in the clock signal has a value of 0 in the data section and the dormant section, but is not limited thereto. That is, in the data section and the dormant section, the low value may have a value exceeding 0 but less than the high value of 3.3V. The decoding signal for this case may be the same as that shown in FIG. 12.

Meanwhile, in FIG. 12, it is described that the second pause section is connected after the second data section, but is not limited thereto. For example, depending on software that generates the clock signal, the second idle section may be immediately followed by the second data section.

Hereinafter, an operation of changing an operating frequency in order to vary a communication speed will be described.

FIGS. 13 to 16 are waveform diagrams for explaining an operation of changing a period of a clock signal.

For example, FIG. 13 is a waveform diagram for explaining an operation when a communication speed is increased.

Referring to FIG. 13, when it is necessary to increase the communication speed, for example, when authentication on a consumable apparatus or the CRUM apparatus 200 is to be performed, the processor 110 may change a second period t1 in an idle section to a fourth period t3 faster than the existing second period t1.

When a period (t1->t3) of the clock signal is changed in the idle section, the CRUM apparatus 200 detects a change of a section and confirms whether the changed section is maintained for a predetermined time or more. When the changed section is maintained for the predetermined time or more, the CRUM apparatus 200 may determine that the communication speed with a main body has changed, and changes a determination time value of the data section and the pause section to a time value corresponding to the changed second period t1.

For example, when a clock signal having the period t2 of 100 kHz in the data section and a period t1 of 200 kHz in the idle section (or the pause section) is changed from 200 kHz to 400 kHz in the idle section (t1->t3), the CRUM apparatus 200 may recognize that data transmission and reception will be performed in the data section of a period t4 of 200 kHz in a subsequent data section, and transmit and receive data in the subsequent data section at 200 kHz.

FIG. 14 is a waveform diagram for explaining an operation when a communication speed is slowed.

Referring to FIG. 14, when the communication speed needs to be slow, for example, when an error occurs or power consumption needs to be slowed down, the processor 110 may change the second period t1 in an idle section to a sixth period t5 slower than the existing second period t1.

When the period (t1->t5) of a clock signal is changed in the idle section, the CRUM apparatus 200 detects a change of the period and confirms whether the changed period is maintained for a predetermined time or more. When the changed period is maintained for the predetermined time or more, the CRUM apparatus 200 may determine that the communication speed with a main body has changed and change a determination time value of the data section and the pause section to a time value corresponding to the changed second period t1.

For example, when a clock signal having the period t2 of 100 kHz in the data section and a period of 200 kHz in the idle section (or the pause section) is changed from 200 kHz to 150 kHz in the idle section (t1->t5), the CRUM apparatus 200 may recognize that data transmission and reception will be performed in the data section of a period t6 of 75 kHz in a subsequent data section, and transmit and receive data in the subsequent data section at 75 kHz.

FIG. 15 is a waveform diagram for explaining an operation when an individual clock signal varies with respect to a plurality of CRUM apparatuses.

Referring to FIG. 15, communication is performed with a clock signal having a default period with respect to a first CRUM apparatus 200-1 and a second CRUM apparatus 200-2. Thereafter, when it is necessary to perform authentication with respect to the first CRUM apparatus 200-1 and communication with respect to the second CRUM apparatus 200-2 in a power save state, a period may be changed to a fourth period t3 faster than the second period t1 in an idle section with respect to the clock signal provided to the first CRUM apparatus 200-1.

At this time, the first CRUM apparatus 200-1 may perform communication faster than the changed period through the same operation as that of the CRUM apparatus of FIG. 13.

In the clock signal provided to the second CRUM apparatus 200-2, the period may be changed to the sixth period t5 slower than the second period t1 in the idle section.

At this time, the second CRUM apparatus 200-2 may perform communication slower than the changed period through the same operation as that of the CRUM apparatus of FIG. 14.

FIG. 16 is a waveform diagram for explaining an operation when a communication speed is adaptively changed.

Referring to FIG. 16, the processor 110 generates a clock signal using a first period and a second period which are initially set as defaults and provides the clock signal to the CRUM apparatus 200.

Thereafter, when it is necessary to make the communication speed slower, the processor 110 may change the second period t1 in an idle section to the sixth period t5 slower than the existing second period t1.

When the period (t1->t5) of the clock signal is changed in the idle section, the CRUM apparatus 200 detects a change of the period and confirms whether the changed period is maintained for a predetermined time or more. When the changed period is maintained for the predetermined time or more, the CRUM apparatus 200 determines that the communication speed with a main body has changed, and changes a determination time value of the data section and the pause section to a time value corresponding to the changed second period t1.

Thereafter, it is necessary to return the communication speed to a basic speed, and the processor 110 may change the sixth period t5 to the second period t1 faster than the sixth period t5 in the idle section.

Also, when it is necessary to change the communication speed to a faster speed for an authentication procedure, the processor 110 may change from the second period t1 to the fourth period t3 in the idle section.

FIG. 17 is a diagram for explaining a communication method performed by an image forming apparatus of the disclosure.

Referring to FIG. 17, a clock signal having a first period and a second period is generated (S1710). For example, a clock signal in which high and low values are alternately repeated in the first period in a data section and the high and low values are alternately repeated in the second period different from the first period in an idle section may be generated and provided to the CRUM apparatus 200.

At this time, the image forming apparatus may transmit and receive data with the CRUM apparatus 200 in the first period in the data section.

Thereafter, when a predetermined event occurs (S1720), the first period and the second period may be changed (S1730) and a clock signal having a changed period may be generated. For example, when it is necessary to authenticate the CRUM apparatus 200 and change a communication speed quickly, the first period of the data section may be changed to a third period faster than the first period, and the second period of the idle section may be changed to a fourth period faster than the second period.

Also, when the communication speed with the CRUM apparatus 200 needs to be reduced, the first period of the data section may be changed to a fifth period slower than the first period, and the second period of the idle section may be changed to a sixth period slower than the second period.

When the second period is changed as described above, the image forming apparatus may transmit and receive data to and from the CRUM apparatus 200 in the changed first period (i.e., the third period or the fifth period) corresponding to the changed second period in the data section.

Therefore, the image forming method of the disclosure may increase or decrease the communication speed when necessary when performing communication. Accordingly, the image forming apparatus 100 may perform authentication on a consumable apparatus faster or perform stable communication even when an error occurs. The communication method as shown in FIG. 17 may be performed on the image forming apparatus having the configuration of FIG. 1 or 2, and also on an image forming apparatus having other configurations.

Meanwhile, the above-described communication method may be implemented in a program and provided to an image forming apparatus. In particular, a program including a communication method may be stored in a non-transitory computer readable medium.

The non-transitory readable medium is not a medium for storing data for a short time such as a register, a cache, a memory, etc., but refers to a medium that semipermanently stores data and may be read by a device. In particular, the various applications or programs described above may be stored on non-volatile readable media such as CD, DVD, hard disk, Blu-ray disk, USB, memory card, ROM, etc.

FIG. 18 is a diagram for explaining a communication operation in a CRUM apparatus of the disclosure.

Referring to FIG. 18, the CRUM apparatus receives a clock signal having a predetermined pulse width in both an idle section and a data section (S1810) and extracts power from the clock signal (S1820). At this time, the clock signal may have high and low values alternately repeated in a data section in a first period and high and low values alternately repeated in a dormant section in a second period different from the first period.

A period of the clock signal is confirmed in an idle section in which data is not transmitted and received (S1830), and when the period of the clock signal is changed, the data may be transmitted and received in the first period corresponding to the changed period in the data section after the idle section.

Therefore, the communication method performed by the CRUM apparatus of the disclosure may be activated without a power terminal by extracting power from the received clock signal. Also, since a change of a communication speed may be detected through a change of a clock frequency, adaptive communication is possible. The communication method as shown in FIG. 18 may be executed on a CRUM apparatus having any one of the configurations of FIGS. 6 to 10, and also on a CRUM apparatus having other configurations.

Meanwhile, the communication method performed by the CRUM apparatus described above may be implemented in a program and provided to the CRUM apparatus. In particular, a program including the communication method performed by the CRUM apparatus may be stored in a non-transitory computer readable medium.

Although the examples of the disclosure have been illustrated and described hereinabove, the disclosure is not limited to the abovementioned examples, but may be variously modified to which the disclosure pertains without departing from the scope and spirit of the disclosure as disclosed in the accompanying claims. These modifications should also be understood to fall within the scope of the disclosure.

The invention claimed is:

1. A customer replacement unit monitoring (CRUM) apparatus, comprising:
   a power extraction circuit to extract power from a high value of a clock signal received from an image forming apparatus, the clock signal having high and low values alternately repeated in a first period in a first data section of the clock signal and the high and low values alternately repeated in a second period different from the first period in a pause section of the clock signal; and
   a control circuit to be activated by the power extracted by the power extraction circuit, and when the second period of the clock signal is changed to a fourth period of the clock signal in an idle section of the clock signal in which data transmission is prepared, the control circuit is to determine transmission and reception of a data signal to and from the image forming apparatus is to be performed at a third period of the clock signal different from the first period of the clock signal for a second data section of the clock signal subsequent to the idle section of the clock signal.

2. The CRUM apparatus as claimed in claim 1, wherein the first period of the clock signal is greater than the second period of the clock signal.

3. The CRUM apparatus as claimed in claim 1, wherein the control circuit is to determine whether a section is the first data section or the pause section based on a period of the clock signal received from the image forming apparatus.

4. The CRUM apparatus as claimed in claim 1, wherein the control circuit is to determine that the second period of the clock signal in the idle section is changed to the fourth period of the clock signal when a period of the clock signal in the idle section is maintained for a predetermined time in the idle section, the predetermined time being different from the second period.

5. The CRUM apparatus as claimed in claim 1, wherein the third period is twice the fourth period in the second data section.

6. The CRUM apparatus as claimed in claim 1, wherein the control circuit includes:
   a memory, and
   a processor to manage the memory in accordance with the data signal.

7. The CRUM apparatus as claimed in claim 1, wherein the power source extracting circuit includes:
   a diode to pass a clock signal having the high value when the clock signal is received from the image forming apparatus, and
   a capacitor to be charged by the clock signal passed by the diode.

8. An image forming apparatus, comprising:
   a customer replacement unit monitoring (CRUM) apparatus to extract power from a clock signal and to be activated by the power extracted from the clock signal, the clock signal having high and low values alternately repeated in a first period in a data section of the clock signal and the high and low values alternately repeated in a second period different from the first period in a pause section of the clock signal; and a processor to:
   control an operation of the image forming apparatus,
   provide the clock signal to the CRUM apparatus, and
   change the clock signal provided to the CRUM apparatus when a predetermined event occurs by changing the first period and the second period.

9. The image forming apparatus as claimed in claim 8, wherein the first period of the clock signal is greater than the second period of the clock signal.

10. The image forming apparatus as claimed in claim 8, wherein when the predetermined event occurs, the processor is to change the first period and the second period in an idle section in which data transmission is prepared.

11. The image forming apparatus as claimed in claim 10, wherein the processor is to maintain the data signal to have a predetermined value in the idle section when the processor changes the first period and the second period in the idle section.

12. The image forming apparatus as claimed in claim 8, wherein when the predetermined event is an authentication of the CRUM apparatus, the processor is to change the first period to a third period which is shorter than the first period and is to change the second period to a fourth period which is shorter than the second period.

13. The image forming apparatus as claimed in claim 8, wherein when the predetermined event is when an error occurs in communicating with the CRUM apparatus, the processor is to change the first period to a third period which is greater than the first period and is to change the second period to a fourth period which is greater than the second period.

14. The image forming apparatus as claimed in claim 8, wherein the image forming apparatus includes a plurality of CRUM apparatuses, and
   the processor is to provide a respective clock signal to each of the plurality of CRUM apparatuses.

15. The image forming apparatus as claimed in claim 8, wherein the CRUM apparatus is to store information about a consumable apparatus mounted to the image forming apparatus, and
   the processor is to receive the information about the consumable apparatus from the CRUM apparatus in the data section.

* * * * *